United States Patent
Liu et al.

(10) Patent No.: US 9,733,900 B2
(45) Date of Patent: Aug. 15, 2017

(54) MULTI-BIT FULL ADDER BASED ON RESISTIVE-SWITCHING DEVICES AND OPERATION METHODS THEREOF

(71) Applicant: PEKING UNIVERSITY, Beijing (CN)

(72) Inventors: Lifeng Liu, Beijing (CN); Yi Hou, Beijing (CN); Bing Chen, Beijing (CN); Bin Gao, Beijing (CN); Dedong Han, Beijing (CN); Yi Wang, Beijing (CN); Xiaoyan Liu, Beijing (CN); Jinfeng Kang, Beijing (CN); Yuhua Cheng, Beijing (CN)

(73) Assignee: PEKING UNIVERSITY, Beijing (CN)

( * ) Notice: Subject to any disclaimer, the term of this patent is extended or adjusted under 35 U.S.C. 154(b) by 0 days.

(21) Appl. No.: 14/897,207

(22) PCT Filed: Dec. 31, 2013

(86) PCT No.: PCT/CN2013/091036
§ 371 (c)(1),
(2) Date: Dec. 9, 2015

(87) PCT Pub. No.: WO2015/100586
PCT Pub. Date: Jul. 9, 2015

(65) Prior Publication Data
US 2016/0313975 A1    Oct. 27, 2016

(51) Int. Cl.
*G06F 7/501* (2006.01)
*G11C 13/00* (2006.01)
*G06F 7/60* (2006.01)

(52) U.S. Cl.
CPC ............ *G06F 7/5013* (2013.01); *G06F 7/607* (2013.01)

(58) Field of Classification Search
CPC ........ G06F 7/501; G06F 7/5013; G11C 13/00
See application file for complete search history.

(56) References Cited

U.S. PATENT DOCUMENTS 7,948,271 B1 * 5/2011 Kuekes ................. B82Y 10/00
326/104
2014/0177315 A1 * 6/2014 Pramanik ........... G11C 13/0069
365/148

FOREIGN PATENT DOCUMENTS

CN      102299692 A    12/2011
CN      102623046 A     8/2012
(Continued)

OTHER PUBLICATIONS

Siemon, Anne. "A Complementary Resistive Switch-Based Crossbar Array Adder." IEEE Xplore. IEEE, Feb. 10, 2015. Web.*
(Continued)

*Primary Examiner* — Andrew Caldwell
*Assistant Examiner* — Omar Dominguez
(74) *Attorney, Agent, or Firm* — Seed IP Law Group LLP (57) ABSTRACT

The present disclosure discloses a full adder based on resistive-switching devices and an operation method thereof. A multi-bit full adder circuit is constituted by using a cross-bar array of resistive-switching devices, wherein data of standard sums is stored on the principle diagonal of the cross-bar array in a nonvolatile manner, and carry data is stored in adjacent units on both sides of the principle diagonal. The carry data is stored according to whether the storage loop (crosstalk loop) is turned on. With the present disclosure, the multi-bit full adder circuit is significantly simplified. Thereby, additional circuits for generating a carry signal are reduced, the circuit delay and chip area are decreased, and the adder has an ability of nonvolatile storage.

10 Claims, 3 Drawing Sheets

(56) References Cited

FOREIGN PATENT DOCUMENTS

| | | | | |
|---|---|---|---|---|
| CN | WO 2012100585 A1 * | 8/2012 | ......... | G11C 11/5685 |
| CN | 102882513 A | 1/2013 | | |

OTHER PUBLICATIONS

International Search Report and Written Opinion (with English translation of the International Search Report), mailed Sep. 1, 2014, for PCT/CN2013/091036, 8 pages.

* cited by examiner

MULTI-BIT FULL ADDER BASED ON RESISTIVE-SWITCHING DEVICES AND OPERATION METHODS THEREOF

TECHNICAL FIELD

The present disclosure relates to the technical field of semiconductor integrated circuits, and in particular, to a multi-bit full adder based on a cross-bar array of resistive-switching devices and an operation method thereof.

BACKGROUND

Although the NAND flash memory, as a main stream of nonvolatile memories currently, has advantages such as high density, low lost etc., the NAND flash memory also face some problems such as insufficient times of erasing and writing (<1e5), slow writing speed (~1ms), high operating voltage (~15V), and difficulty in further size reduction etc. Therefore, a new type of memory is continuously researched for substituting the NAND flash memory. The resistive-switching devices attract wide attentions from the research community and industry community due to many advantages such as sufficient times of erasing and writing (>1e9), high erasing and writing speed (~10ns), low operating voltage (<3V), simple process, compatibility with CMOS, and convenient size reduction (with an occupied unit area of ~$4F^2$).

A typical structure of the resistive-switching device is a three-layer structure with an electrode, a resistive-switching layer and an electrode, which is similar to a capacitor. The resistive-switching layer may have a resistive-switching under the excitation of a voltage or a current. In terms of voltage operating modes, the resistive-switching device may operate in two operating modes, i.e., a single electrode mode and a dual electrode mode. A resistive-switching phenomenon in the single electrode mode depends on a size of voltage excitation, regardless of a direction; and a resistive-switching phenomenon in the dual electrode mode depends on a size and a direction of the applied voltage excitation. Currently, the resistive-switching device is primarily applied as a resistive-switching memory. According to the principle of the resistive-switching memory, different information is stored using different resistance values of the resistive-switching layer between two electrodes, and the stored information is rewritten by applying a voltage pulse or Direct Current (DC) sweep to the electrodes to change the resistance value of the resistive-switching layer.

In addition to the application in the resistive-switching memory, the resistive-switching device has potentials in logical devices, neuronal devices etc. due to its simple structure and excellent performance. The present disclosure proposes a method for achieving a full adder based on a cross-bar array of resistive-switching devices.

An adder is a component in a digital circuit for executing an addition operation, and is the basis of constituting an arithmetic logic unit in a core microprocessor of an electronic computer. In an electronic system, the adder is primarily responsible for calculating data such as addresses, indexes etc. In addition, the adder is also an important part of some other hardware such as a binary multiplier etc. Adders may be divided into half adders and full adders. The half adders implement an add function of two binary numbers. In addition to the function of the half adders, the full adders implement functions of carry input and carry output at each bit, so as to achieve a complete operation.

Currently, adders in the digital circuit are generally achieved using a CMOS logical circuit by means of Complementary transmission Pipe Logic (CPL), Dual transmission Pipe Logic (DPL) etc. A 1-bit adder achieved using a CMOS logic needs about 20 transistors. If a 4-bit adder or a more than 4-bit adder is to be achieved, a number of transistors which is greater than a number of linearly increased transistors is needed, an occupied chip area is large, and reduction in power consumption becomes difficult due to the use of a large number of transistors.

SUMMARY

In consideration of one or more existing problems, a multi-bit full adder based on resistive-switching devices and an operation method thereof are proposed.

In an aspect of the present disclosure, a multi-bit full adder based on resistive-switching devices is provided, comprising:

N word lines arranged in parallel, wherein N is larger than or equal to 3 and $1^{st}$ to $N-1^{th}$ word lines of the N word lines respectively correspond to one of an N−1-bit addend and an N−1-bit augend;

N word line gating devices respectively connected to corresponding word lines;

N bit lines arranged in parallel and placed across the word lines arranged in parallel, wherein $1^{st}$ to $N-1^{th}$ bit lines of the N bit lines respectively correspond to the other of the N−1-bit addend and the N−1-bit augend;

N bit line gating devices respectively connected to corresponding bit lines;

N*N resistive-switching units each being located in a crossing point of a corresponding word line and a corresponding bit line and being connected to the corresponding word line and the corresponding bit line, wherein each resistive-switching unit has a first resistance state, a second resistance state, a third resistance state, and a fourth resistance state, and a resistance value in the first resistance state is less than a resistance value in the second resistance state, the resistance value in the second resistance state is less than a resistance value in the third resistance state, and the resistance value in the third resistance state is less than a resistance value in the fourth resistance state, where the first resistance state and the third resistance state represent "0" and the second resistance state and the fourth resistance state represent "1";

wherein, in data input through the word lines, input "1" represents a positive level pulse, and input "0" represents a zero level pulse, in data input through the bit lines, input "1" represents a negative level pulse, and input "0" represents a zero level pulse, a standard sum of an $i^{th}$ bit of the addend and an $i^{th}$ bit of the augend is stored in a resistive-switching unit in an $i^{th}$ row and an $i^{th}$ column of the array of resistive-switching units in a nonvolatile manner, and a carry value is determined according to resistance states of the resistive-switching unit in the $i^{th}$ row and the $i^{th}$ column, a resistive-switching unit in the $i^{th}$ row and an $i+1^{th}$ column, and a resistive-switching unit in an $i+1^{th}$ row and the $i^{th}$ column in the array of resistance-switching units.

According to some embodiments, when the resistive-switching unit in the $i^{th}$ row and the $i^{th}$ column, the resistive-switching unit in the $i^{th}$ row and the $i+1^{th}$ column, and the resistive-switching unit in the $i+1^{th}$ row and the $i^{th}$ column are in a low resistance state, the carry value is determined to be 1.

According to some embodiments, when any of the resistive-switching unit in the $i^{th}$ row and the $i^{th}$ column, the resistive-switching unit in the $i^{th}$ row and the $i+1^{th}$ column, and the resistive-switching unit in the $i+1^{th}$ row and the $i^{th}$ column is in a high resistance state, the carry value is determined to be 0.

According to some embodiments, a readout voltage which will not cause a significant change in the resistance value is applied to the $i^{th}$ word line or the $i^{th}$ bit line, and if a significant current is read out, it indicates that the carry value is 1, and if no significant current is read out, it indicates that the carry value is 0.

According to some embodiments, the gating devices are gating transistors or transmission gates.

According to some embodiments, all resistive-switching devices in the cross-bar array of resistive-switching devices are reset to the fourth resistance state before an addition operation is executed.

According to some embodiments, when a full addition operation is completed, all standard sums can be read out once by applying a readout voltage which will not cause a significant change in the resistance value to the word lines, and constitute a complete operation result of the full adder together with a carry bit from the highest bit.

According to some embodiments, a resistance value of a resistive-switching unit is changed to a lower resistance value by applying a positive level to a word line or applying a negative level to a bit line.

According to some embodiments, a resistance value of a resistive-switching unit is modulated by a width of electrical pulses applied to a word line and a bit line, and the voltage pulses are applied to the word line and the bit line at different times.

In another aspect of the present disclosure, a method for operating a multi-bit full adder based on resistive-switching devices is provided, the multi-bit full adder comprising:

N word lines arranged in parallel, wherein N is larger than or equal to 3 and $1^{st}$ to $N-1^{th}$ word lines of the N word lines respectively correspond to one of an N–1-bit addend and an N–1-bit augend;

N word line gating devices respectively connected to corresponding word lines;

N bit lines arranged in parallel and placed across the word lines arranged in parallel, wherein $1^{st}$ to $N-1^{th}$ bit lines of the N bit lines respectively correspond to the other of an N–1-bit addend and an N–1-bit augend;

N bit line gating devices respectively connected to corresponding bit lines;

N*N resistive-switching units each being located in a crossing point of a corresponding word line and a corresponding bit line and being connected to the corresponding word line and the corresponding bit line, wherein each resistive-switching unit has a first resistance state, a second resistance state, a third resistance state, and a fourth resistance state, and a resistance value in the first resistance state is less than a resistance value in the second resistance state, the resistance value in the second resistance state is less than a resistance value in the third resistance state, and the resistance value in the third resistance state is less than a resistance value in the fourth resistance state, where the first resistance state and the third resistance state represent "0" and the second resistance state and the fourth resistance state represent "1";

the method comprising:

inputting data through the word lines, wherein input "1" represents a positive level pulse, and input "0" represents a zero level pulse;

inputting data through the bit lines, wherein input "1" represents a negative level pulse, and input "0" represents a zero level pulse;

storing a standard sum of an $i^{th}$ bit of the addend and an $i^{th}$ bit of the augend in a resistive-switching unit in an $i^{th}$ row and an $i^{th}$ column of the array of resistive-switching units in a nonvolatile manner; and determining a carry value according to resistance states of the resistive-switching unit in the $i^{th}$ row and the $i^{th}$ column, a resistive-switching unit in the $i^{th}$ row and an $i+1^{th}$ column, and a resistive-switching unit in an $i+1^{th}$ row and the $i^{th}$ column in the array of resistance-switching units.

In the solutions of the present disclosure, the multi-bit full adder circuit is constituted by using a cross-bar array of resistive-switching devices, wherein data of standard sums is stored on the principle diagonal of the cross-bar array in a nonvolatile manner, and carry data is stored in adjacent units on both sides of the principle diagonal. The carry data is stored according to whether the storage loop is turned on. With the present disclosure, the multi-bit full adder circuit is significantly simplified.

DETAILED DESCRIPTION

Specific embodiments of the present disclosure will be described in detail below. It should be noted that the embodiments described here are illustrated merely by way of example instead of limiting the present disclosure. In the following description, numerous specific details are set forth to provide a more thorough understanding of the present disclosure. However, it will be obvious to those skilled in the art that the present disclosure may be practiced without these specific details. In other instances, well-known structures, circuits, materials or methods are not described in detail in order to avoid obscuring the present disclosure.

Reference throughout this specification to "one embodiment", "an embodiment", "one example" or "an example" means that a particular feature, structure, or characteristic described in connection with the embodiment or example is included in at least one embodiment of the present invention. Thus, the appearances of the phrase "in one embodiment", "in an embodiment", "one example" or "an example" in various places throughout this specification are not necessarily all referring to the same embodiment or example. Furthermore, the particular features, structures, or characteristics may be combined in any suitable combination and/or sub-combination in one or more embodiments or examples. In addition, those skilled in the art should understand that a term "and/or" used herein comprises any or all combinations of one or more listed related items.

In some embodiments, a novel method for implementing a multi-bit full adder based on a cross-bar array of resistive-switching devices is provided. With the introduction of the resistive-switching devices, a structure of the multi-bit full adder is largely simplified, a chip area is saved, and power consumption is expected to be significantly reduced in the premise of ensuring good performance by taking advantage of simple structure, easy integration, nonvolatile storage etc. of the cross-bar array of resistive-switching devices.

Figure 1:
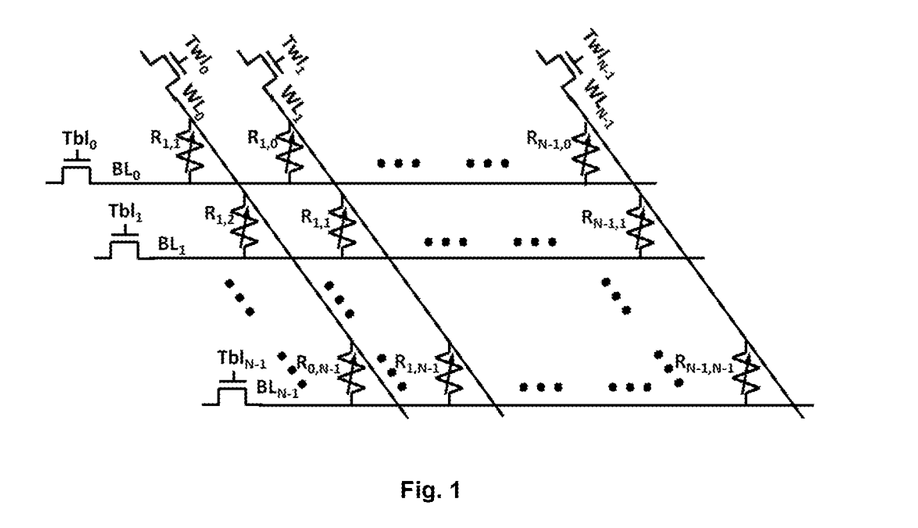
FIG. 1 is a diagram of a cross-bar array of resistive-switching devices according to the present disclosure.

In some embodiments, the full adder includes a cross-bar array based on resistive-switching devices, comprising: N patterned bottom electrodes arranged in parallel, N patterned top electrodes arranged in parallel and placed (in general perpendicularly) across the bottom electrodes, and a resistive-switching layer (N*N) arranged in crossing positions of the bottom electrodes and the top electrodes. The above bottom electrodes and top electrodes are generally be referred to as Word Lines (WL) and Bit Lines (BL) in the application of resistive-switching memories. In the present disclosure, for convenience, the above bottom electrodes and top electrodes are also referred to as WL and BL, as shown in FIG. 1. Various word lines and various bit lines are connected to corresponding gating transistors or transmission gates (Twl, Tbl), to control a word line and a bit line which are selected in a certain operation.

Signal input of the multi-bit full adder is implemented by applying pulse voltage signals to the WLs and BLs. An order of the signal input, voltage values, pulse widths etc. depend on a preset operation mode. Operation parameters are primarily set based on performance of the resistive-switching devices per se. When resistive-switching devices with different material are to be selected, it only needs to change the setting of some operation parameters according to the different material, without influencing the implementation of the functions of the multi-bit full adder in the technical solutions of the present disclosure. Resistive-switching devices in a dual electrode mode are used in the solutions of the present disclosure.

Preferably, WLs are above BLs in the solutions of the present disclosure, wherein WLs are top electrodes of various resistive-switching devices, and BLs are bottom electrodes of various resistive-switching devices, as shown in FIG. 1.

Figure 2:
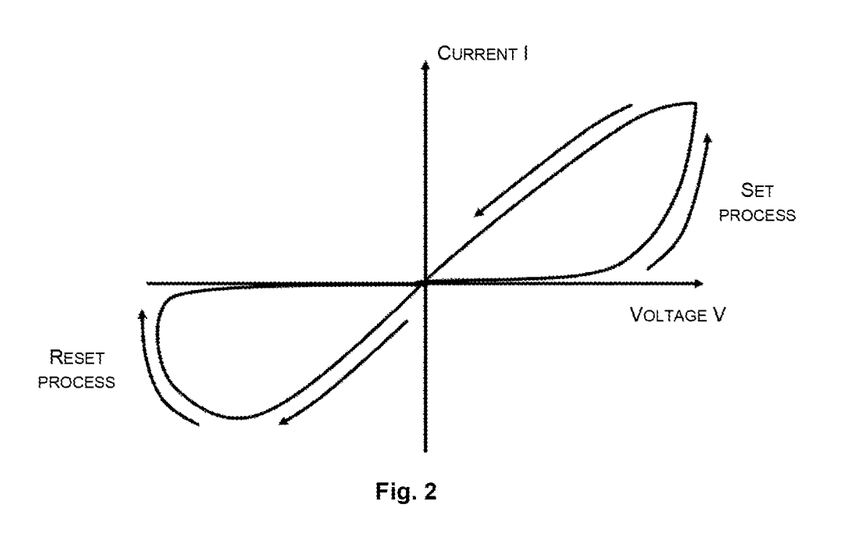
FIG. 2 is a DC I-V characteristics of a resistive-switching device according to the present disclosure.

In the solutions of the present disclosure, when a positive voltage pulse is applied to a top electrode of a resistive-switching device or a negative voltage pulse is applied to a bottom electrode of the resistive-switching device, a Set process occurs and a resistance value decreases, and when a negative voltage pulse is applied to the top electrode of the resistive-switching device or a positive voltage pulse is applied to the bottom electrode of the resistive-switching device, a Reset process occurs and a resistance value increases. The DC characteristic of the resistive-switching device is shown in FIG. 2.

Figure 3:
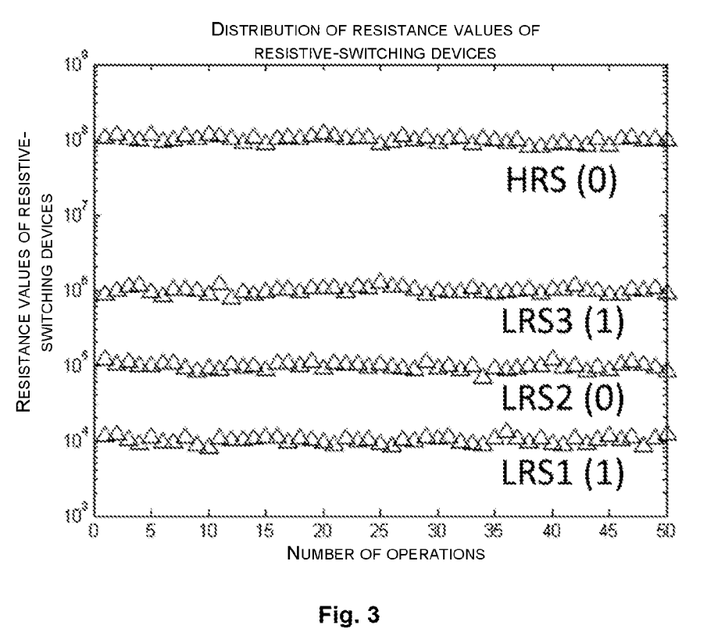
FIG. 3 is a distribution diagram of resistance values in four resistance states of a resistive-switching device according to the present disclosure.

Resistive-switching devices with many material and structures having multiple resistance states have been prepared at this stage, and in some designs, a number of resistance states implemented using a single resistive-switching device even exceeds 16. However, there are a limited number of windows between a highest resistance state and a lowest resistance state of a resistive-switching device. As principle fluctuation due to the resistive-switching mechanism of the resistive-switching device is unavoidable, with increase of the resistance states, windows between the resistance states become smaller, thereby resulting in difficulty in distinguishing the resistance values and increase in error probability of writing and reading. In the solutions of the present disclosure, in consideration of the adder's requirements on the accuracy of the addition operation, only 4 resistance states are used, i.e., a High Resistance State (HRS), a Low Resistance State 3 (LRS3), a Low Resistance State 2 (LRS2), and a Low Resistance State 1 (LRS1). That is, there is 2bit resistance states in total (in an order of HRS>LRS3>LRS2>LRS1). In consideration of most resistive-switching devices can achieve windows>1e5, 4 resistance states are used to ensure that resistance value windows between adjacent resistance states are always >10 in many times of operations, as shown in FIG. 3. In this way, reliability of the multi-bit full adder based on a cross-bar array of resistive-switching devices is largely improved while reducing requirements on design of error correction circuits and a tolerance and redundancy mechanism, which complies with the development direction of circuit design.

Figure 4:
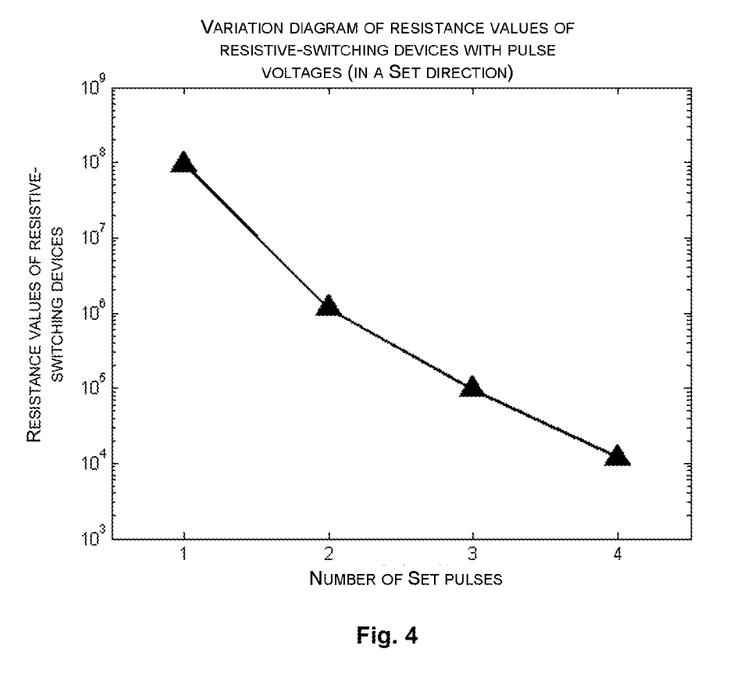
FIG. 4 is a result of variation in a resistance value of a resistive-switching device with an externally applied Set voltage pulse according to the present disclosure.

In the solutions of the present disclosure, a resistance value of a resistive-switching device is modulated by using a width of a Set voltage pulse, i.e., a number of pulse voltages with the same width, so as to rewrite binary information stored in the resistive-switching device, as shown in FIG. 4.

Figure 5:
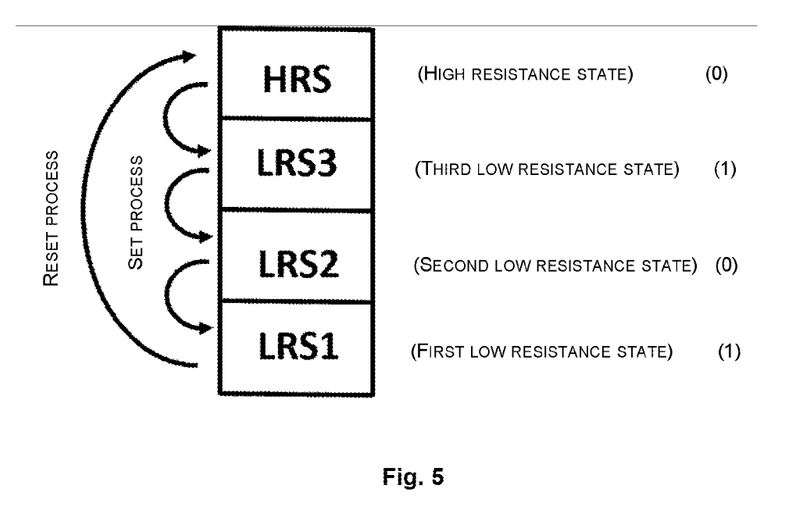
FIG. 5 is setting of logic values corresponding to four resistance states of a resistive-switching device according to the present disclosure.

In the solutions of the present disclosure, the HRS and the LRS2 represents "0", and the LRS3 and the LRS1 represents "1", as shown in FIG. 5. In other embodiments, other resistance value states may also be used to represent "0" or "1".

A standard sum result and a carry signal from each bit of the multi-bit full adder are stored as resistance values in the cross-bar array of resistive-switching devices in a nonvolatile manner. A result signal or an intermediate signal in the process of an addition operation are read out by applying a small readout voltage (Vread) to a word line and a bit line and reading out a current of a particular word line and a particular bit line by an external circuit. The readout current values primarily reflect resistance values of various resistive-switching devices in the multi-bit full adder based on a cross-bar array of resistive-switching devices. According to a pre-designed operation mode, the resistance value corresponds to a calculation result.

In the solutions of the present disclosure, an N*N cross-bar array of resistive-switching devices is shown in FIG. 1. WLs and BLs are denoted as $WL_i$ (i=0, 1, 2 . . . N−1) and $BL_j$ (j=0, 1, 2 . . . N−1) respectively in order. A resistive-switching device selected in a crossing point of an $i^{th}$ word line $WL_i$ and a $j^{th}$ bit line $BL_j$ is denoted as $R_{i,j}$ (0≤i,j≤N−1). N−1-bit (if carry is not considered at a lowest bit and carry toward a higher bit than a highest bit is considered at the highest bit, N−1-bit addition operation can be achieved by the N*N array, and if carry is considered at the lowest bit, N−2-bit addition operation can be achieved by the N*N array) data to be added is $A_{N-1}A_{N-2} \ldots A_2A_1A_0$ and $B_{N-1}B_{N-2} \ldots B_2B_1B_0$, wherein $A_{N-1}$ and $B_{N-1}$ are highest bits respectively, and $A_0$ and $B_0$ are lowest bits respectively. $A_i$ is input through $WL_i$, and $B_j$ is input through $BL_j$ (0≤i,j≤N−1). For example, $A_{N-1}$ is input through $WL_{N-1}$, $A_3$ is input through $WL_3$, and $B_1$ is input through $BL_1$. Data at the $A_i$ and $B_i$ are input through $WL_i$ and $BL_i$ respectively. It should be noted that $R_{i,i}$ is selected commonly by $WL_i$ and $BL_i$. Nine devices formed by crossing of a word line where $R_{i,i}$ is located, two adjacent word lines thereof, a bit line where $R_{i,j}$ is located and two adjacent bit lines thereof are $R_{i-1,i-1}$, $R_{i-1,i}$, $R_{i-1,i+1}$; $R_{i,i-1}$, $R_{i,i}$, $R_{i,i+1}$; $R_{i+1,i-1}$, $R_{i+1,i}$, $R_{i+1,i+1}$, or may be denoted as a matrix (when i,j≥1):

$R_{i-1,i-1}$ $R_{i-1,i}$ $R_{i-1,i+1}$ $R_{i,i-1}$ $R_{i,i}$ $R_{i,i+1}$ $R_{i+1,i-1}$ $R_{i+1,i}$ $R_{i+1,i+1}$

In the solutions of the present disclosure, if data is input through a WL, input "1" represents a positive level short pulse Vpulsewl, and input "0" represents absence of an applied pulse in the operation process; and if data is input through a BL, input "1" represents a negative level short pulse Vpulsebl, and input "0" represents absence of an applied pulse in the operation process. Due to the dual-electrode resistive-switching characteristics of the resistive-switching device in the present disclosure, if "1" is input on the WL or the BL, a Set pulse is applied to the resistive-switching device. It should be noted that as described above, instead of a size of the voltage pulses applied to the WL and the BL, a width of the voltage pulses is primarily used for modulating the resistance value of the resistive-switching device, and the voltage pulses should not be applied to the WL and the BL at the same time, to prevent the voltages from being added. Instead, a clock circuit should be used to enable the voltages to be applied at different times (a difference between the different times >100 ns). As a full adder, the adder per se complies with a communicative principle. In the solutions of the present disclosure, the positive and negative pulses are primarily designed in different manners in consideration that the addend and the augend are located at a top electrode and a bottom electrode respectively and the resistive-switching device in a dual-electrode mode is asymmetrical. Such logic design can be conveniently achieved through a difference between pulse generators connected to the WL and the BL of the cross-bar array of resistive-switching devices. Values of Vpulsewl and Vpulsebl are shown in the following tables 1 and 2.

TABLE 1

| $A_0$ | 0 | 1 |
|---|---|---|
| Vpulsewl | 0 | +Vpulse |

TABLE 2

| $B_0$ | 0 | 1 |
|---|---|---|
| Vpulsebl | 0 | −Vpulse |

A positive level Vpulse is applied to the WL and a negative level −Vpulse is applied to the BL to enable the resistance value of the resistive-switching device to change to a lower resistance value. One Vpulse corresponds to a change to an adjacent resistance value once (for example, HRS->LRS3 or LRS2->LRS1), as shown in FIG. 4.

$A_i$ and $B_i$ are an $i^{th}$ bit of two augends. In accordance with the principle of the logic of the full adder, three parts of the logic are needed to be completed at the $i^{th}$ bit: a first part is to consider a bit $C_{i-1}$ from a previous bit, a second part is to solve a standard output $S_i$, and a third part is to solve a carry bit $C_i$ to be transferred to an i+1$^{th}$ bit.

In the solutions of the present disclosure, all resistive-switching devices in the N*N array are reset to an HRS before the operation.

The solutions of the present disclosure will be described by taking operations of a standard sum $S_0$ of $A_0$ and $B_0$, a carry signal $C_0$, a standard sum $S_1$ of $A_1$ and $B_1$, and a carry signal $C_1$ when i=0 and i=1.

$A_0$ and $B_0$ are lowest bits, and a truth table of the full adder is as follows.

TABLE 3

| $A_0$ | $B_0$ | $S_0$ | $C_0$ |
|---|---|---|---|
| 0 | 0 | 0 | 0 |
| 0 | 1 | 1 | 0 |
| 1 | 0 | 1 | 0 |
| 1 | 1 | 0 | 1 |

Gating transistors Twls and Tbls of WLs and a BLs are controlled to gate all WLs and BLs. Voltage pulses Vpulsewl and Vpulsebl (values of which depend on values of $A_0$ and $B_0$, with reference to tables 1 and 2) are respectively applied in turn to $WL_0$ and $BL_0$, and $WL_1$ and $BL_1$ are connected to a low level. After the voltage pulses are input, data stored in $R_{0,0}$ is the standard sum $S_0$, and a carry data is stored in a carry signal storage loop $C_0$. The carry signal storage loop $C_0$ is a loop from $WL_1$ to $BL_1$ which is constituted by connecting three resistive-switching devices $R_{0,0}$, $R_{0,1}$ and $R_{1,0}$ in series. The carry data is stored in a manner as follows: when three resistive-switching devices $R_{0,0}$, $R_{0,1}$ and $R_{1,0}$ are in a low resistance state (a low resistance state 3, a low resistance state 2, or a low resistance state 1), the carry signal storage loop $C_0$ is turned on and $C_0=1$, that is, when any of the three resistive-switching devices $R_{0,0}$, $R_{0,1}$ and $R_{1,0}$ is in a high resistance state, the carry signal storage loop $C_0$ is turned off and $C_0=0$.

When $A_1$ and $B_1$ are to be calculated, it needs to consider the carry bit $C_0$ from $A_0$ and $B_0$, and then the standard sum $S_1$ and the carry bit $C_1$ to be transferred to the next bit will be calculated. Truth value tables are listed as follows respectively in two cases, i.e., $C_0=0$ and $C_0=1$.

TABLE 4

| When $C_0 = 0$, $A_1$ | $B_1$ | $S_1$ | $C_1$ |
|---|---|---|---|
| 0 | 0 | 0 | 0 |
| 0 | 1 | 1 | 0 |
| 1 | 0 | 1 | 0 |
| 1 | 1 | 0 | 1 |

TABLE 5

| When $C_0 = 1$, $A_1$ | $B_1$ | $S_1$ | $C_1$ |
|---|---|---|---|
| 0 | 0 | 1 | 0 |
| 0 | 1 | 0 | 1 |
| 1 | 0 | 0 | 1 |
| 1 | 1 | 1 | 1 |

Before $A_1$ and $B_1$ are calculated, it needs to read and then judge the carry bit $C_0$ from the previous bit. In the solutions of the present disclosure, $C_0$ is read in a manner as follows: gating transistors Twls and Tbls of WLs and BLs are controlled to only gate $WL_1$ and $BL_1$, and a small readout voltage Vread which will not cause a significant change in the resistance value is applied to $WL_1$ (or $BL_1$), and if a significant current is read out, it indicates that $C_0=1$, and if no significant current is read out, it indicates that $C_0=0$. As $R_{1,1}$ and other $R_{i,j}$ (i>1,j>1) are in a high resistance state (HRS), and only $R_{0,1}$, $R_{0,0}$ and $R_{1,0}$ are in a low resistance state, a leakage current path between $WL_1$ and $BL_1$ which is constituted by connecting $R_{0,1}, R_{0,0}$ and $R_{1,0}$ in series is turned on. That is, only when the carry signal storage loop $C_0$ is turned on and $C_0=1$, the significant current can be read out. Thereby, judgment of whether the carry signal storage loop is turned on is achieved, thereby achieving judgment of the carry data $C_0$ from the previous bit.

It should be noted that when $C_0=0$, the operation of $A_1$ and $B_1$ are the same as the operation of $A_0$ and $B_0$. If $C_0=0$, a standard sum $S_1$ is stored in $R_{1,1}$, and a carry data is stored in a carry signal storage loop $C_1$ from $WL_2$ to $BL_2$ which is constituted by connecting three resistive-switching devices $R_{1,1}$, $R_{1,2}$ and $R_{2,1}$ in series. When the three resistive-switching devices $R_{1,1}$, $R_{1,2}$ and $R_{2,1}$ are in a low resistance state (a low resistance state 3, a low resistance state 2, or a low resistance state 1), the carry signal storage loop $C_1$ is turned on and $C_1=1$. That is, when any of the three resistive-switching devices $R_{1,1}$, $R_{1,2}$ and $R_{2,1}$ is in a high resistance state, the carry signal storage loop $C_1$ is turned off and $C_1=0$.

When $C_0=1$, the truth table for the operation of $A_1$ and $B_1$ is different from that of $A_0$ and $B_0$. In the reading and judging step of an external circuit, if the information of $C_0=1$ is read out, a Vpulsec should be applied in addition to the standard input $A_1$ (corresponding to Vpulsewl) and $B_1$ (corresponding to Vpulsebl). The additional Vpulsec may be applied to the $WL_1$ port or the $BL_1$ port. When Vpulsec is applied to the $WL_1$ port, a size thereof is +Vpulse, and when Vpulsec is applied to the $BL_1$ port, a size thereof is −Vpulse. Application of Vpulsec is shown in the following table.

TABLE 6

| $A_1$ ($WL_1$) | $B_1$ ($BL_1$) | Position of Vpulsec |
|---|---|---|
| 0 | 0 | WL/BL |
| 0 | 1 | WL |
| 1 | 0 | BL |
| 1 | 1 | WL/BL |

The only principle to follow is to avoid a condition that one of the WL and the BL is applied with two voltage pulses and the other of the WL and BL is not applied with a pulse. This principle can be followed by designing a gating transistor which is controlled by an input signal or a gating circuit based on a resistive-switching device. The present disclosure places emphasis on implementation of the adder based on a cross-bar array of resistive-switching devices and storage of carry data by means of "readout operation crosstalk". The peripheral design will not be described in detail in the solutions of the present disclosure.

After the above operations are performed, storage positions of final calculation results are the same as those when $C_0=0$, i.e., the standard sum $S_1$ is stored in $R_{1,1}$, the carry data is stored in the carry signal storage loop $C_1$ from $WL_2$ to $BL_2$ which is constituted by connecting three resistive-switching devices $R_{1,1}$, $R_{1,2}$ and $R_{2,1}$ in series. When the three resistive-switching devices $R_{1,1}$, $R_{1,2}$ and $R_{2,1}$ are in a low resistance state (a low resistance state 3, a low resistance state 2, or a low resistance state 1), the carry signal storage loop $C_1$ is turned on and $C_1=1$. That is, when any of the three resistive-switching devices $R_{1,1}$, $R_{1,2}$ and $R_{2,1}$ is in a high resistance state, the carry signal storage loop $C_1$ is turned off and $C_1=0$.

The operations and carry processes of the $0^{th}$ bit and the $1^{st}$ bit have been described, and the operation methods of the $2^{nd}$ bit, the $3^{rd}$ bit . . . the n−$1^{th}$ bit are the same as those described above. In particular, a standard sum $S_{n-1}$ of the n−$1^{th}$ bit is stored in $R_{n-1,n-1}$, a carry data is stored in a carry signal storage loop $C_{n-1}$ which is constituted by connecting three resistive-switching devices $R_{n-1,n-1}, R_{n-1,n}$ and $R_{n,n-1}$ in series. When the three resistive-switching devices $R_{n-1,n-1}, R_{n-1,n}$ and $R_{n,n-1}$ are in a low resistance state (a low resistance state 3, a low resistance state 2, or a low resistance state 1), the carry signal storage loop $C_{n-1}$ is turned on and $C_{n-1}=1$. That is, when any of the three resistive-switching devices $R_{n-1,n-1}, R_{n-1,n}$ and $R_{n,n-1}$ is in a high resistance state, the carry signal storage loop $C_{n-1}$ is turned off and $C_{n-1}=0$. $C_{n-1}$ is read out in the same manner as that used for reading out $C_0$ when $A_1$, $B_1$ (the $1^{st}$ bits) are calculated.

If N is increased, data with more bits can be calculated. As standard sums of various bits of the N−1-bit full adder are located on the principle diagonal of the cross-bar array, all standard sums $S_{n-1}S_{n-2} \ldots S_2S_1S_0$ can be read out once by applying a small readout voltage Vread which will not cause a significant change in the resistance value to the WLs, and constitute a complete operation result of the full adder together with a carry bit $C_{n-1}$ from the highest bit.

If it needs to perform a next operation using the N*N units, all units will be reset to a high resistance state, so as to start a new operation. If the next operation is temporarily not to be performed, the result of the current operation will be stored in the array in a nonvolatile manner.

In the solutions of the present disclosure, the multi-bit full adder circuit is constituted by using a cross-bar array of resistive-switching devices, wherein data of standard sums is stored on the principle diagonal of the cross-bar array in a nonvolatile manner, and carry data is stored in adjacent units on both sides of the principle diagonal. A similar "readout operation crosstalk" phenomenon which is disadvantage for operation of memories in a cross-bar array of resistive-switching memories is utilized efficiently by the carry signal storage loop, to store the carry data according to whether the storage loop (crosstalk loop) is turned on. With the present disclosure, the multi-bit full adder circuit is significantly simplified. Thereby, additional circuits for generating a carry signal are reduced, the circuit delay and chip area are decreased, and the adder has an ability of nonvolatile storage.

As an array of resistive-switching memories can also be implemented by using the cross-bar array of resistive-switching devices in the present disclosure, the present disclosure facilitates integration of calculators and memories, thereby improving a density of integrated circuits.

A specific manner of achieving a 4-bit full adder using a 5*5 cross-bar array of resistive-switching devices will be described by way of example below when N=5. Resistance values of resistive-switching devices in the cross-bar array of resistive-switching devices and corresponding numerical values are simply denoted as matrixes as follows.

$$\begin{bmatrix} R_{0,0} & \ldots & R_{0,4} \\ \vdots & R_{i,j} & \vdots \\ R_{4,0} & \ldots & R_{4,4} \end{bmatrix} \xleftarrow{\text{Resistance}}_{\text{values}} \xrightarrow{\text{Numerical}}_{\text{values}} \begin{bmatrix} N_{0,0} & \ldots & N_{0,4} \\ \vdots & N_{i,j} & \vdots \\ N_{4,0} & \ldots & N_{4,4} \end{bmatrix}$$

In accordance with the above operation mode, in the beginning, all devices of the cross-bar array of resistive-switching devices are reset an HRS. The distribution of the resistance values of the cross-bar array and corresponding numerical values are denoted as matrixes as follows.

$$
\begin{array}{ccccc}
HRS & HRS & HRS & HRS & HRS \\
HRS & HRS & HRS & HRS & HRS \\
HRS & HRS & HRS & HRS & HRS \\
HRS & HRS & HRS & HRS & HRS \\
HRS & HRS & HRS & HRS & HRS
\end{array}
$$

$$
\xleftarrow{\text{Resistance}}\quad\xrightarrow{\text{Numerical}}\quad
\begin{array}{ccccc}
0 & 0 & 0 & 0 & 0 \\
0 & 0 & 0 & 0 & 0 \\
0 & 0 & 0 & 0 & 0 \\
0 & 0 & 0 & 0 & 0 \\
0 & 0 & 0 & 0 & 0
\end{array}
$$

An implementation of a 4-bit full addition operation of 1010+1111 will be described below.

In this instance, $A_3=1$, $A_2=0$, $A_1=1$, $A_0=0$, $B_3=1$, $B_2=1$, $B_1=1$, and $B_0=1$.

In the first step, a $0^{th}$ bit is calculated. All Twls and Tbls are turned on to gate all WLs and BLs. As $A_0=0$, no voltage pulse is applied to $WL_0$, and as $B_0=1$, $-V$pulse is applied to $BL_0$. As all WLs are gated and $-V$pulse is applied to $BL_0$, there is a current flowing through a row of resistive-switching devices connected to $BL_0$, and a Set process occurs to set HRS to LRS3. After the first step is performed, the distribution of the resistance values of the cross-bar array and corresponding numerical values are denoted as matrixes as follows.

$$
\begin{array}{ccccc}
LRS3 & LRS3 & LRS3 & LRS3 & LRS3 \\
HRS & HRS & HRS & HRS & HRS \\
HRS & HRS & HRS & HRS & HRS \\
HRS & HRS & HRS & HRS & HRS \\
HRS & HRS & HRS & HRS & HRS
\end{array}
$$

$$
\xleftarrow{\text{Resistance}}\quad\xrightarrow{\text{Numerical}}\quad
\begin{array}{ccccc}
1 & 1 & 1 & 1 & 1 \\
0 & 0 & 0 & 0 & 0 \\
0 & 0 & 0 & 0 & 0 \\
0 & 0 & 0 & 0 & 0 \\
0 & 0 & 0 & 0 & 0
\end{array}
$$

$N_{0,0}$ is a standard sum $S_0=1$, $C_0$ is stored in a carry signal storage loop $C_0$ which is constituted by three resistive-switching devices $R_{0,0}$, $R_{0,1}$ and $R_{1,0}$. It can be seen that $R_{0,0}=LRS3$, $R_{0,1}=LRS3$ and $R_{1,0}=HRS$. As $R_{1,0}$ is HRS, the carry signal storage loop $C_0$ is turned off and $C_0=0$. The above description is merely illustrative. In a practical circuit operation, a result of $C_0$ may be read out by applying a small readout voltage signal in the second step to involve in the operation of the $2^{nd}$ bit.

In the second step, the carry bit from the $1^{st}$ bit is read out. The Twl and Tbl are controlled to only turn on $Twl_1$ and $Tbl_1$. That is, only $WL_1$ and $BL_1$ are gated, and a small readout voltage Vread which will not cause a significant change in the resistance value is applied to $WL_1$ (or $BL_1$). In the present example, as the voltage pulse is only applied to $WL_0$ and $BL_0$ in the first step, and $R_{i,j}$ ($i\geq 1$ and $j\geq 1$) has not been subjected to a voltage pulse, $R_{i,j}$ ($i\geq 1$ and $j\geq 1$)=HRS and $R_{1,1}$=HRS. Therefore, the only possibility to cause a significant current to be read out is that a crosstalk path (carry signal storage loop $C_0$) comprised of $R_{0,0}$, $R_{0,1}$ and $R_{1,0}$ is in a low resistance state. In the present example, $R_{00}=LRS3$, $R_{01}=LRS3$, and $R_{10}=HRS$. Therefore, as $R_{10}$ is in an HRS, the above path is not turned on, and there is no significant current to be read out. Thereby, it is judged that $C_0=0$.

In the third step, as it is determined that $C_0=0$ in the second step, the operation of the $2^{nd}$ bit is similar to that in the first step. That is, all Twls and Tbls are turned on to gate all WLs and BLs. As $A_1=1$, a voltage pulse Vpulse is applied to $WL_1$, and as $B_1=1$, $-V$pulse is applied to $BL_1$. As all BLs are gated and Vpulse is applied to $WL_1$, there is a current flowing through a column of resistive-switching devices connected to $WL_1$, and a Set process occurs. As all WLs are gated and $-V$pulse is applied to $BL_1$, there is a current flowing through a row of resistive-switching devices connected to $BL_1$, and a Set process occurs. After the third step is performed, the distribution of the resistance values of the cross-bar array and corresponding numerical values are denoted as matrixes as follows.

$$
\begin{array}{ccccc}
LRS3 & LRS2 & LRS3 & LRS3 & LRS3 \\
LRS3 & LRS2 & LRS3 & LRS3 & LRS3 \\
HRS & LRS3 & HRS & HRS & HRS \\
HRS & LRS3 & HRS & HRS & HRS \\
HRS & LRS3 & HRS & HRS & HRS
\end{array}
$$

$$
\xleftarrow{\text{Resistance}}\quad\xrightarrow{\text{Numerical}}\quad
\begin{array}{ccccc}
1 & 0 & 1 & 1 & 1 \\
1 & 0 & 1 & 1 & 1 \\
0 & 1 & 0 & 0 & 0 \\
0 & 1 & 0 & 0 & 0 \\
0 & 1 & 0 & 0 & 0
\end{array}
$$

$N_{1,1}$ is a standard sum $S_1=0$, $C_1$ is stored in a carry signal storage loop $C_1$ which is constituted by three resistive-switching devices $R_{1,1}$, $R_{1,2}$ and $R_{2,1}$. It can be seen that $R_{1,1}=LRS2$, $R_{1,2}=LRS3$ and $R_{2,1}=LRS3$. As $R_{1,1}$, $R_{1,2}$ and $R_{2,1}$ are in an LRS, the carry signal storage loop $C_1$ is turned on and $C_1=1$. The above description is merely illustrative. In a practical circuit operation, a result of $C_1$ may be read out by applying a small readout voltage signal in the fourth step to involve in the operation of the $3^{rd}$ bit.

In the fourth step, the carry bit $C_1$ from the $2^{nd}$ bit is read out. The Twl and Tbl are controlled to only turn on $Twl_2$ and $Tbl_2$. That is, only $WL_2$ and $BL_2$ are gated, and a small readout voltage Vread which will not cause a significant change in the resistance value is applied to $WL_2$ (or $BL_2$). In the present example, as the voltage pulse is only applied to $WL_0$ and $BL_0$ in the first step, the voltage pulse is only applied to $WL_1$ and $BL_1$ in the third step, and $R_{i,j}$ ($i\geq 2$ and $j\geq 2$) has not been subjected to a voltage pulse, $R_{i,j}$ ($i\geq 2$ and $j\geq 2$)=HRS and $R_{2,2}$=HRS. Therefore, the only possibility to cause a significant current to be read out is that a crosstalk path (carry signal storage loop $C_1$) comprised of $R_{1,1}$, $R_{1,2}$ and $R_{2,1}$ is in a low resistance state. In the present example, $R_{1,1}=LRS2$, $R_{1,2}=LRS3$, and $R_{2,1}=LRS3$. Therefore, as $R_{1,1}$, $R_{1,2}$, $R_{2,1}$ are in an LRS, the carry signal storage loop $C_1$ is turned on, and there is a significant current to be read out. Thereby, it is judged that $C_1=1$.

In the fifth step, as it is determined that $C_1=1$ in the fourth step, the operation of the $3^{rd}$ bit is similar to that in the first step. However, as described in the above solutions of the present disclosure, it needs to additionally apply a pulse. That is, all Twls and Tbls are turned on to gate all WLs and BLs. As $A_2=0$ and $B_2=1$, in consideration that a pulse will be additionally applied when $C_1=1$, a voltage pulse Vpulse is applied to $WL_2$ (although $A_2=0$, an additional pulse needs to be applied), and $-V$pulse is applied to $BL_2$. As all BLs are gated and Vpulse is applied to $WL_2$, there is a current flowing through a column of resistive-switching devices connected to $WL_2$, and a Set process occurs. As all WLs are gated and −Vpulse is applied to $BL_2$, there is a current flowing through a row of resistive-switching devices connected to $BL_2$, and a Set process occurs. After the fifth step is performed, the distribution of the resistance values of the cross-bar array and corresponding numerical values are denoted as matrixes as follows.

| LRS3 | LRS2 | LRS2 | LRS3 | LRS3 |
|------|------|------|------|------|
| LRS3 | LRS2 | LRS2 | LRS3 | LRS3 |
| LRS3 | LRS2 | LRS2 | LRS3 | LRS3 |
| HRS  | LRS3 | LRS3 | HRS  | HRS  |
| HRS  | LRS3 | LRS3 | HRS  | HRS  |

<-- Resistance Numerical values values -->

| 1 | 0 | 0 | 1 | 1 |
|---|---|---|---|---|
| 1 | 0 | 0 | 1 | 1 |
| 1 | 0 | 0 | 1 | 1 |
| 0 | 1 | 1 | 0 | 0 |
| 0 | 1 | 1 | 0 | 0 |

$N_{2,2}$ is a standard sum $S_2=0$, $C_2$ is stored in a carry signal storage loop $C_2$ which is constituted by three resistive-switching devices $R_{2,2}$, $R_{2,3}$ and $R_{3,2}$. It can be seen that $R_{2,2}$=LRS2, $R_{2,3}$=LRS3 and $R_{3,2}$=LRS3. As $R_{2,2}$, $R_{2,3}$ and $R_{3,2}$ are in an LRS, the carry signal storage loop $C_2$ is turned on and $C_2=1$. The above description is merely illustrative. In a practical circuit operation, a result of $C_2$ may be read out by applying a small readout voltage signal in the sixth step to involve in the operation of the $4^{th}$ bit.

In the sixth step, the carry bit $C_2$ from the $3^{rd}$ bit is read out. The Twl and Tbl are controlled to only turn on $Twl_3$ and $Tbl_3$. That is, only $WL_3$ and $BL_3$ are gated, and a small readout voltage Vread which will not cause a significant change in the resistance value is applied to $WL_3$ (or $BL_3$). In the present example, as the voltage pulse is only applied to $WL_0$ and $BL_0$ in the first step, the voltage pulse is only applied to $WL_1$ and $BL_1$ in the third step, the voltage pulse is only applied to $WL_2$ and $BL_2$ in the fifth step, and $R_{i,j}$ ($i \geq 3$ and $j \geq 3$) has not been subjected to a voltage pulse, $R_{i,j}$ ($i \geq 3$ and $j \geq 3$)=HRS and $R_{3,3}$=HRS. Therefore, the only possibility to cause a significant current to be read out is that a crosstalk path (carry signal storage loop $C_2$) comprised of $R_{2,2}$, $R_{2,3}$ and $R_{3,2}$ is in a low resistance state. In the present example, $R_{2,2}$=LRS2, $R_{2,3}$=LRS3, and $R_{3,2}$=LRS3. Therefore, as $R_{2,2}$, $R_{2,3}$ and $R_{3,2}$ are in an LRS, the carry signal storage loop $C_2$ is turned on, and there is a significant current to be read out. Thereby, it is judged that $C_2=1$.

In the seventh step, as it is determined that $C_2=1$ in the sixth step, the operation of the $3^{rd}$ bit is similar to that in the fifth step. However, compared with the first step, it needs to additionally apply a pulse. That is, all Twls and Tbls are turned on to gate all WLs and BLs. As $A_3=1$ and $B_3=1$, in consideration that a pulse will be applied additionally when $C_2=1$, two voltage pulses Vpulse are applied to $WL_3$ (one pulse needs to be applied when $A_3=1$, and the other pulse needs to be additionally applied), and −Vpulse is applied to $BL_3$. As all BLs are gated and two pulses Vpulse are applied to $WL_3$, there is a current flowing through a column of resistive-switching devices connected to $WL_3$, and two Set processes occur. As all WLs are gated and −Vpulse is applied to $BL_3$, there is a current flowing through a row of resistive-switching devices connected to $BL_3$, and a Set process occurs. After the seventh step is performed, the distribution of the resistance values of the cross-bar array and corresponding numerical values are denoted as matrixes as follows.

| LRS3 | LRS2 | LRS2 | LRS1 | LRS3 |
|------|------|------|------|------|
| LRS3 | LRS2 | LRS2 | LRS1 | LRS3 |
| LRS3 | LRS2 | LRS2 | LRS1 | LRS3 |
| LRS3 | LRS2 | LRS2 | LRS1 | LRS3 |
| HRS  | LRS3 | LRS3 | LRS2 | HRS  |

<-- Resistance Numerical values values -->

| 1 | 0 | 0 | 1 | 1 |
|---|---|---|---|---|
| 1 | 0 | 0 | 1 | 1 |
| 1 | 0 | 0 | 1 | 1 |
| 1 | 1 | 0 | 1 | 1 |
| 0 | 1 | 1 | 0 | 0 |

$N_{3,3}$ is a standard sum $S_3=1$, $C_3$ is stored in a carry signal storage loop $C_3$ which is constituted by three resistive-switching devices $R_{3,3}$, $R_{3,4}$ and $R_{4,3}$. It can be seen that $R_{3,3}$=LRS1, $R_{3,4}$=LRS3 and $R_{4,3}$=LRS2. As $R_{3,3}$, $R_{3,4}$ and $R_{4,3}$ are in an LRS, the carry signal storage loop $C_3$ is turned on and $C_3=1$. The above description is merely illustrative. In a practical circuit operation, a result of $C_3$ may be read out by applying a small readout voltage signal in the subsequent step to involve in the operation of a higher bit.

Thus, $S_0$, $S_1$, $S_2$, $S_3$ and the carry bit $C_3$ from the highest bit have been correctly calculated as illustrated in table 7 below.

TABLE 7

| $A_3 A_2 A_1 A_0$ | $B_3 B_2 B_1 B_0$ | $S_3 S_2 S_1 S_0$ | $C_3$ |
|-------------------|-------------------|-------------------|-------|
| 1010              | 1111              | 1001              | 1     |

It should be noted that if a carry signal $C_{-1}$ from a lower bit needs to be considered, it only needs to increase the scale of the cross-bar array of resistive-switching devices, and thereby an N*N array can be used to perform an full addition operation of N−1 bits with a carry signal $C_{N-1}$ from the highest bit, and can also perform an operation of N−2 bits with a carry signal $C_{-1}$ from the lowest bit and a carry signal $C_{N-1}$ from the highest bit. In the above solutions and specific implementations of the present disclosure, functions of operations of carry signals and standard sums have been completely described. The operation of N−2 bits with a carry signal $C_{-1}$ from the lowest bit and a carry signal $C_{N-1}$ from the highest bit can be achieved similarly using the N*N array.

While the present invention has been described with reference to several typical embodiments, it should be understood that the terms used herein are illustrative and exemplary terms instead of restrictive terms. As the present invention can be implemented in many forms without departing from the spirit or substance of the present invention, it should be understood that the above embodiments are not limited to any detail described above, and instead, should be widely explained in the spirit and scope defined by the appended claims, and thus any change and variation falling into the scope of the claims or equivalents thereof should be encompassed by the appended claims.

We claim:

1. A multi-bit full adder based on resistive-switching devices, comprising:
   N word lines arranged in parallel, wherein N is larger than or equal to 3 and $1^{st}$ to $N-1^{th}$ word lines of the N word lines respectively correspond to one of an N−1-bit addend and an N−1-bit augend;
   N word line gating devices respectively connected to corresponding word lines;
   N bit lines arranged in parallel and placed across the word lines arranged in parallel, wherein $1^{st}$ to $N-1^{th}$ bit lines of the N bit lines respectively correspond to the other of the N−1-bit addend and the N−1-bit augend;
   N bit line gating devices respectively connected to corresponding bit lines;
   N*N resistive-switching units each being located in a crossing point of a corresponding word line and a corresponding bit line and being connected to the corresponding word line and the corresponding bit line, wherein each resistive-switching unit has a first resistance state, a second resistance state, a third resistance state, and a fourth resistance state, and a resistance value in the first resistance state is less than a resistance value in the second resistance state, the resistance value in the second resistance state is less than a resistance value in the third resistance state, and the resistance value in the third resistance state is less than a resistance value in the fourth resistance state, where the first resistance state and the third resistance state represent "0" and the second resistance state and the fourth resistance state represent "1";
   wherein, in data input through the word lines, input "1" represents a positive level pulse, and input "0" represents a zero level pulse, in data input through the bit lines, input "1" represents a negative level pulse, and input "0" represents a zero level pulse, a standard sum of an $i^{th}$ bit of the addend and an $i^{th}$ bit of the augend is stored in a resistive-switching unit in an $i^{th}$ row and an $i^{th}$ column of the array of resistive-switching units in a nonvolatile manner, and a carry value is determined according to resistance states of the resistive-switching unit in the $i^{th}$ row and the $i^{th}$ column, a resistive-switching unit in the $i^{th}$ row and an $i+1^{th}$ column, and a resistive-switching unit in an $i+1^{th}$ row and the $i^{th}$ column in the array of resistance-switching units.

2. The multi-bit full adder according to claim 1, wherein when the resistive-switching unit in the $i^{th}$ row and the $i^{th}$ column, the resistive-switching unit in the $i^{th}$ row and the $i+1^{th}$ column, and the resistive-switching unit in the $i+1^{th}$ row and the $i^{th}$ column are in a low resistance state, the carry value is determined to be 1.

3. The multi-bit full adder according to claim 1, wherein when any of the resistive-switching unit in the $i^{th}$ row and the $i^{th}$ column, the resistive-switching unit in the $i^{th}$ row and the $i+1^{th}$ column, and the resistive-switching unit in the $i+1^{th}$ row and the $i^{th}$ column is in a high resistance state, the carry value is determined to be 0.

4. The multi-bit full adder according to claim 1, wherein a readout voltage which will not cause a significant change in the resistance value is applied to the $i^{th}$ word line or the $i^{th}$ bit line, and if a significant current is read out, it indicates that the carry value is 1, and if no significant current is read out, it indicates that the carry value is 0.

5. The multi-bit full adder according to claim 1, wherein the gating devices are gating transistors or transmission gates.

6. The multi-bit full adder according to claim 1, wherein all resistive-switching devices in the cross-bar array of resistive-switching devices are reset to the fourth resistance state before an addition operation is executed.

7. The multi-bit full adder according to claim 1, wherein when a full addition operation is completed, all standard sums can be read out once by applying a readout voltage which will not cause a significant change in the resistance value to the word lines, and constitute a complete operation result of the full adder together with a carry bit from the highest bit.

8. The multi-bit full adder according to claim 1, wherein a resistance value of a resistive-switching unit is changed to a lower resistance value by applying a positive level to a word line or applying a negative level to a bit line.

9. The multi-bit full adder according to claim 1, wherein a resistance value of a resistive-switching unit is modulated by a width of electrical pulses applied to a word line and a bit line, and the voltage pulses are applied to the word line and the bit line at different times.

10. A method for operating a multi-bit full adder based on resistive-switching devices, the multi-bit full adder comprising:
   N word lines arranged in parallel, wherein N is larger than or equal to 3 and $1^{st}$ to $N-1^{th}$ word lines of the N word lines respectively correspond to one of an N−1-bit addend and an N−1-bit augend;
   N word line gating devices respectively connected to corresponding word lines;
   N bit lines arranged in parallel and placed across the word lines arranged in parallel, wherein $1^{st}$ to $N-1^{th}$ bit lines of the N bit lines respectively correspond to the other of an N−1-bit addend and an N−1-bit augend;
   N bit line gating devices respectively connected to corresponding bit lines;
   N*N resistive-switching units each being located in a crossing point of a corresponding word line and a corresponding bit line and being connected to the corresponding word line and the corresponding bit line, wherein each resistive-switching unit has a first resistance state, a second resistance state, a third resistance state, and a fourth resistance state, and a resistance value in the first resistance state is less than a resistance value in the second resistance state, the resistance value in the second resistance state is less than a resistance value in the third resistance state, and the resistance value in the third resistance state is less than a resistance value in the fourth resistance state, where the first resistance state and the third resistance state represent "0" and the second resistance state and the fourth resistance state represent "1";
   the method comprising:
   inputting data through the word lines, wherein input "1" represents a positive level pulse, and input "0" represents a zero level pulse;
   inputting data through the bit lines, wherein input "1" represents a negative level pulse, and input "0" represents a zero level pulse;
   storing a standard sum of an $i^{th}$ bit of the addend and an $i^{th}$ bit of the augend in a resistive-switching unit in an $i^{th}$ row and an $i^{th}$ column of the array of resistive-switching units in a nonvolatile manner; and
   determining a carry value according to resistance states of the resistive-switching unit in the $i^{th}$ row and the $i^{th}$ column, a resistive-switching unit in the $i^{th}$ row and an $i+1^{th}$ column, and a resistive-switching unit in an $i+1^{th}$ row and the $i^{th}$ column in the array of resistance-switching units.

* * * * *